United States Patent [19]

Starp

[11] 4,354,752
[45] Oct. 19, 1982

[54] PHOTOGRAPHIC CAMERA

[76] Inventor: Franz Starp, Mittlere Steige 36, 7547 Wildbad 5, Fed. Rep. of Germany

[21] Appl. No.: 253,244

[22] Filed: Apr. 13, 1981

[30] Foreign Application Priority Data

Apr. 16, 1980 [DE] Fed. Rep. of Germany ....... 3014550

[51] Int. Cl.³ ............................................. G03B 17/38
[52] U.S. Cl. ................................. 354/232; 354/187; 354/234; 354/269; 354/271; 354/272
[58] Field of Search ............... 354/174, 176, 186, 187, 354/194, 228, 232–235, 258, 266, 269, 271, 272, 295, 21; 352/78 C

[56] References Cited

U.S. PATENT DOCUMENTS

3,817,608 6/1974 Neudecker et al. ............... 354/21 X
3,935,581 1/1976 Starp .................................. 354/272 X Primary Examiner—Joseph W. Hartary
Assistant Examiner—William B. Perkey

[57] ABSTRACT

A photographic camera having a rear lens carrier with a ground-glass screen frame capable of receiving a separate film cassette insertable thereat, and having a front lens carrier frame provided with a between-the-lens shutter containing electromagnetically driven shutter segments and diaphragm blades; an electronic control device which is connectable to the camera for controlling the electromagnetic operation of the shutter segments and diaphragm blades; and an adapter which is mechanically connectable directly or indirectly to the rear lens carrier or ground-glass screen frame and which is electrically connectable to the electronic control device, and which is capable of converting mechanical switching pulses received at the camera upon insertion of the film cassette thereat into electrical pulses for controlling the control device and in turn the operation of the shutter segments and diaphragm blades, whereby to provide an automatic cassette mechanism usable in a camera having an electromagnetically driven shutter and diaphragm mechanism.

10 Claims, 8 Drawing Figures

PHOTOGRAPHIC CAMERA

The present invention relates to a photographic camera, especially a ground-glass screen type camera, having a rear lens carrier or ground-glass screen frame, which operates as a holder for a measuring or film cassette, and a front lens carrier frame provided with a between-the-lens shutter, which is attached to the front lens carrier frame and which is provided with electromagnetically actuatable shutter segments and diaphragm blades, and also which is connectable by means of a cable to an electronic control device for operating the shutter segments and diaphragm blades and for setting, measuring, inserting into and/or controlling the corresponding exposure parameters of the camera, as well as with a special adapter for converting mechanical pulses received at the camera upon insertion of a cassette thereat into electrical pulses for controlling the operation of the control device and in turn the operation of the shutter segments and diaphragm blades.

In the case of professional cameras, of the type having a rear lens carrier or ground-glass screen frame which operates as a holder for a measuring or film cassette, and which are provided with a mechanical shutter, i.e. with such a shutter arrangement whose shutter segments and diaphragm blades are driven conventionally by spring force by way of mechanical members, a so-called automatic cassette mechanism has already been used therewith which substantially simplifies the operation of the camera.

In specialist circles, an automatic cassette mechanism is generally understood to constitute a cassette responsive cable release direct mechanical connection between the rear wall portion of the camera and the front mechanical shutter, and its purpose is to bring about an automatic closure of the camera shutter, e.g. for taking the next photograph, upon insertion of the cassette into the camera. Prior to such closure, the mechanical shutter is held in the fully open position for a period sufficient for the photographer to observe the ground-glass screen for the usual purposes.

Specifically, such automatic closure of the mechanical shutter takes place during the insertion of a film cassette or the like into the rear ground-glass screen frame, whereby to actuate the automatic cassette mechanism or cable release, and load the camera with film. For this purpose, the known type of automatic cassette mechanism or cable release is connected at one end to the mechanical shutter of the camera and at the other end to the ground-glass screen frame thereof, and in fact is connected to the latter so that it is subjected to a pressure load or mechanical load, upon the insertion of the film cassette or the like into the camera.

The object of this pressure load is to transmit mechanical pressure to a mechanical part in the known automatic cassette mechanism which moves the segments of the mechanical shutter into the closed position. If the film cassette is removed from the ground-glass screen frame, the part which actuates the shutter segments experiences a pressure relief, the mechanical shutter opens automatically, e.g. under spring force, and the previous state is restored, which again renders possible the observation of the ground-glass screen.

In addition to operating ease, all the above features have the further advantage that the photographer can direct his full concentration to the object to be photographed during the preparation work for taking a photograph.

It is among the objects and advantages of the present invention to overcome drawbacks and deficiencies in the prior art and to provide an automatic cassette mechanism containing arrangement for a camera of the first mentioned electromagnetic shutter type, i.e. for a camera with electrically insertable exposure parameters, in which an electronic control device and a shutter arrangement with electromagnetically, rather than mechanically, actuable diaphragm blades and shutter segments are provided, and in which such automatic cassette mechanism arrangement is distinguished by easy handling, a reliable mode of both mechanical and electrical operation and a simple construction requiring only a few parts.

Other and further objects and advantages of the present invention will become apparent from a study of the within specification and accompanying drawings, in which.

According to the present invention, a photographic camera apparatus is provided, more especially a ground-glass screen containing camera, having a rear lens carrier or ground-glass screen frame, which operates as a holder for a measuring or film cassette, and a front lens carrier frame with a between-the-lens shutter, which is attached to the front lens carrier frame and which is provided with electromagnetically actuated shutter segments and diaphragm blades, and also which is connectable by means of a cable or the like to an electronic control device for setting, measuring and inserting exposure parameters into the camera, and wherein an adapter is provided which converts mechanical switching pulses into electrical pulses and which has switching contacts, the adapter being connectable indirectly or directly to the rear lens carrier or ground-glass screen frame by means of a mechanical transmitter member which serves at the same time to actuate the switching contacts, and also being electrically connectable to the electronic control device for controlling the operation of the electromagnetic shutter.

It will be appreciated that an automatic cassette mechanism of the known type heretofore could be provided for special cameras having an electromagnetic shutter and a remote control therefor by means of an electronic control device, but its operating advantage had hitherto to be renounced for such cameras because of the specific physical characteristics of the electromagnetic shutter and the resultant difficulty in producing an effective connection between this type of shutter and the cassette holder. This was simply because the basic concept of an electromagnetic shutter does not permit directly controllable operating facilities similar to those such as are offered with a mechanical shutter.

A structurally advantageous concept of a device, which will operate absolutely reliably even after a long service life, for converting mechanical switching pulses into electrical pulses is seen to lie in the fact that, for the actuation of the switching contacts associated with the electromagnetic drives for the shutter segments and diaphragm blades, preferably a one-armed and a two armed rotatably mounted lever are provided, and the two are constructed and associated one with the other in such a way that pressure loads or mechanical loads, proceeding from the mechanical transmitting member and acting upon the one-armed lever, are transmitted to the two-armed lever. One particular advantage with this general type of transmitting member arrangement, which simplifies the operation of the camera, is that, for the synchronous actuation of shutter segments and diaphragm blades, only one transmitting member has to be actuated.

In order to enable the photographer to judge also the depth of field when preparing to take a photograph, a finger push button is preferably provided which acts only upon the two-armed lever for the exclusive actuation of that switching contact which is associated with the electromagnetic drive for the diaphragm blades.

A positive and technically simple mechanical force transmission of the mechanical switching pulses from the cassette holder to the electromagnetic shutter can be achieved when a mechanical transmitting cable is used in the manner of a cable release for the connection of the adapter to the rear lens carrier or ground-glass screen frame, and an electrical conduit or cable is used for the electrical connection of the adapter to the electronic control device.

A particularly simple preferred embodiment, which allows the preferably flexible transmitter to be eliminated, can be achieved in that the adapter can be placed directly onto the rear lens carrier or ground-glass screen frame and can be connected to the electronic control device by way of a cable.

A further simple preferred variant can be provided if the adapter is placed directly onto the electronic control device and is connected to the rear lens carrier or ground-glass screen frame by means of a mechanical transmitting cable. This embodiment enables the electrical cable, which connects the adapter to the electronic control device, to be eliminated.

One further preferred feature of the present invention provides that the socket of the electronic control device for connecting the adapter thereto is associated with the rotatably mounted toggle of a selective lever switching device of the control device for opening the shutter and diaphragm, so that it is only possible to connect the plug belonging to the corresponding electrical cable of the adapter when the lever switching device is in a specific switching position which effects the full closure of the shutter and the setting of the diaphragm blades to the working position. Operating errors which might otherwise be made by the photographer and which in turn might be the result of a possible incorrect switch position can be avoided in this manner.

Figures 1, 2, 6:
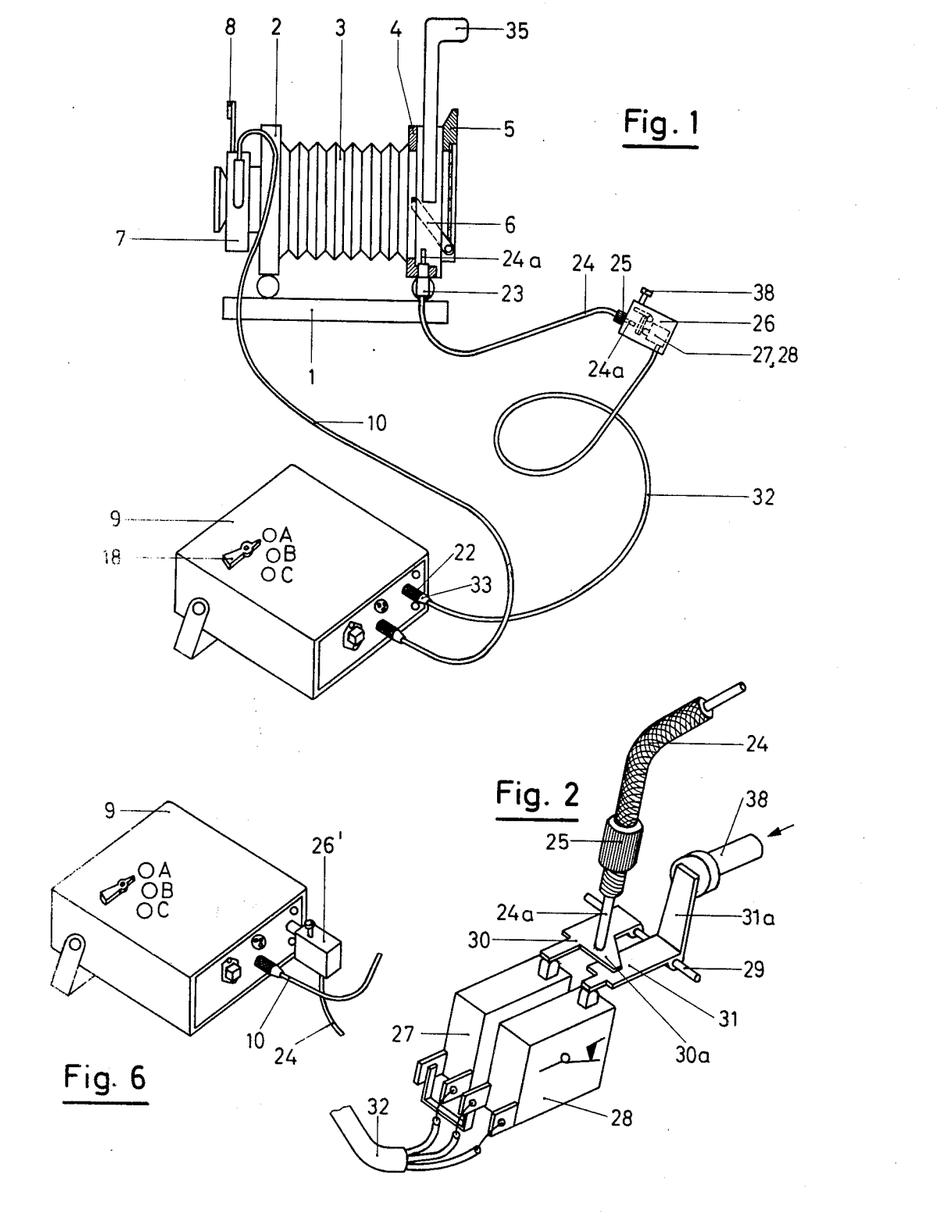
FIG. 1 is a schematic view of a special or ground-glass screen camera in conjunction with an electronic control device for setting, measuring and controlling exposure parameters and also showing an adapter for converting mechanical switching pulses into electrical pulses.
FIG. 2 is a schematic perspective view, on a larger scale, of the switch arrangement of the adapter of FIG. 1.
FIG. 6 is a schematic view which shows a modified arrangement provided with a direct connection between the adapter and the electronic control device.

Referring to the drawing, and initially FIG. 1, a camera is shown having a base frame 1 constructed according to the arrangement of an optical bench, a front lens opening or objective aperture containing lens carrier 2, an expandable tubular housing bellows 3, a film window or viewing window containing rear lens carrier 4, a rear ground-glass window screen frame 5, associated with the rear lens carrier 4 and normally held by means of spring-loaded pivotally mounted linkage lugs 6 against rearward displacement from rear lens carrier 4, and a front objective lens shutter or shutter and diaphragm system 7 attached to the front lens carrier 2.

One specific feature of this shutter 7 is that it is designed as a between-the-lens shutter and is provided with a corresponding electromagnetic drive for each of the shutter segments and diaphragm blades (cf. FIG. 5 at A and B), which are mounted so as to pivot backwards and forwards, i.e. between respective closed and fully open positions.

The electromagnetic drive associated with each respective shutter segment and diaphragm blade system may be designed and conceived in known manner so that, for example, the shutter segments both in the opening direction and in the closing direction are electromagnetically actuated by changing the direction of current flow in the corresponding coil of the electromagnetic drive, whereas the diaphragm blades are only actuated in the opening direction but in this case against the action of a restoring spring tending to return the diaphragm blades to fully closed position.

Thus, if the blades of the diaphragm system, designed as an electromagnetically operated automatic diaphragm, have reached the open position, they are magnetically held in this position, as are the shutter segments, so as to build up to a selective aperture size or width, in the usual way under the return spring force, i.e. after the supply of current to the electromagnetic drive has been interrupted, which selective size or width has been preselected and set on the camera by means of a manually actuable diaphragm adjuster 8.

The electromagnetic drive for the diaphragm blades and that for the shutter segments are respectively controlled by a generally conventional control device 9 electrically connected thereto at the shutter 7 via an electrical conduit or cable 10, in the usual way. The control device 9 is, inter alia, suitable for the manual pre-selection of the exposure time by means of a conventional shutter speed element or for the light dependent detection and transmission operatively of this exposure parameter into the electromagnetic shutter 7 automatically by means of a conventional light measuring probe.

A control device with these specific features is the subject matter of German Auslegeschrift No. 2,840,185 and is more fully described therein, in respect of its construction and mode of operation.

One essential component of a control device of this type is an electronic control circuit of the usual suitable kind for automatically controlling the operation of the shutter segments and diaphragm blades by controlling automatically in turn the operation or energizing of the corresponding electromagnetic drives or drive means therefor. This electronic control circuit, for convenience, has only been indicated as a block 11 in the circuit diagram according to FIG. 3. The electromagnetic drives for the shutter segments and the diaphragm blades, which are electrically connectable to the electronic control circuit 11, and which are disposed on the side of the shutter in the usual manner in the annular space in the lens and shutter housing, are only shown symbolically in this circuit diagram and are indicated as electromagnetic drives 12 and 13.

Figure 3:
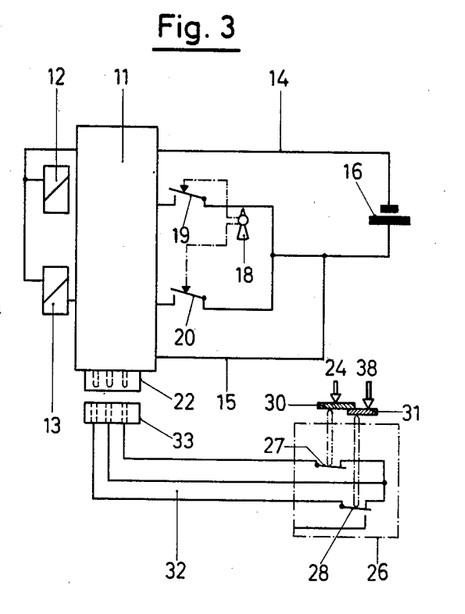
FIG. 3 is a schematic simplified circuit diagram of a control circuit in the control device of FIG. 1 which serves, inter alia, to apply the battery voltage to the electromagnetic drive for the shutter segments and the diaphragm blades in the electromagnetically driven shutter.

It can also be seen from FIG. 3 that the electronic control circuit 11 is energized, by way of circuit lines 14 and 15, with a current from the battery or the like current source 16 which itself may be accommodated in the control housing of the device 9.

In addition to the electronic control circuit 11, the control device 9 also has the contemplated capacity to influence the electromagnetic drives 12 and 13 manually. The purpose of this manual control is to enable the photographer, when using the control device 9, to make observations through the front lens opening or objective aperture in the front lens carrier 2 in conventional manner via the tubular bellows 3, the rear window in the rear lens carrier 4, and the ground-glass screen 5a, when judging the depth of field through the open shutter both with a pre-set, i.e. working size or width, diaphragm aperture and with a diaphragm aperture which is in the fully open position, i.e. with maximum aperture size or width (cf. FIG. 5).

To achieve these operating procedures, a manually actuatable switch lever 18 is provided which is associated with contact switches 19 and 20 in the control device 9 in such a way that, upon actuation from a basic position in which the shutter segments are closed and the diaphragm blades are set to a selective working aperture, the switch 19 is first of all closed and subsequently the switch 20 is closed. If this happens, the electromagnetic drive 12, which is associated with the shutter segments, and the electromagnetic drive 13, which moves the diaphragm blades, are supplied with the battery voltage, whereby the shutter segments are first of all moved from the closed position to the open position, i.e. when the switch 19 is closed, and subsequently the diaphragm blades are moved from the selective working aperture size or width position into the fully open or maximum aperture size or width position, i.e. when the switch 20 is sequentially thereafter also closed.

Figure 5:
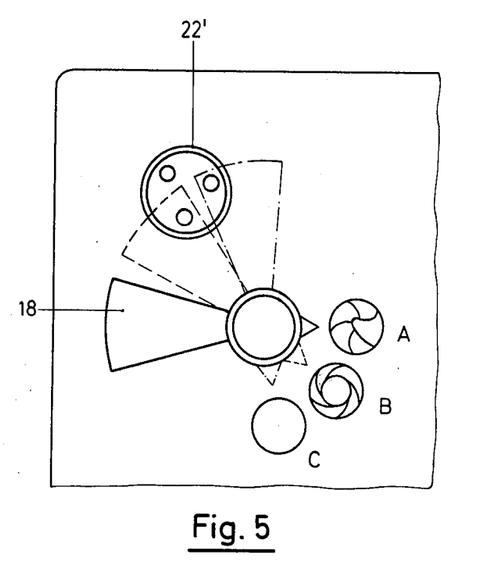
FIG. 5 is a schematic view which shows a manually actuatable toggle switch, rotatably disposed on the housing of the electronic control device corresponding to that of FIG. 1, and its various switching positions.

The various switch positions of the manually selectively operated switching member 18, which is preferably designed as a toggle switch having a manual lever handle, are denoted by "A," "B" and "C" in the views shown in FIGS. 1, 5 and 6; in FIG. 5, the actual state of the shutter segments and diaphragm blades is also additionally shown symbolically. Consequently, as seen from the front of the camera, as depicted in FIG. 5, "A" position signifies shutter (closed) and diaphragm (working position) set, camera ready to take photograph, the shutter segments being shown;

"B" position signifies shutter (open) and diaphragm (working position) set for observation of ground-glass screen for judgement of depth of field, the diaphragm blades being shown; and "C" position signifies shutter (open) and diaphragm (fully open) set to bright ground-glass screen with reduced recognition of depth of field, the completely open lens opening or light admitting objective aperture being shown.

According to the view in FIG. 5, the toggle switch 18 is rotatably mounted in the housing of the control device 9. Non-rotatably connected to this switch lever 18 are switching cams and concordant contact switches which co-operate with them, which are of conventional type and which are disposed inside the control housing 9 and cannot therefore be seen in this figure.

As the dotted lines in FIG. 3 indicate, the switching cams co-operate with the contact switches 19 and 20 in a time-staggered manner in such a way that, when leaving the basic position "A" (FIG. 5) of the switch lever 18, the switch 19 is first actuated to an intermediate position and a voltage is supplied to the electromagnetic drive 12, whereby the shutter opens and remains in the open position, i.e., depth of field position "B" (FIG. 5), for the ground-glass screen to be observed. The diaphragm in this case is still in the working position, whereby the opportunity exists for judging the depth of field.

If, however, the photographer attaches more importance to a bright ground-glass screen and less importance to a good observation of the depth of field, then he only needs to turn the switch 18 further to the ultimate position, and this results in the contact switch 20 being actuated in addition to the contact switch 19, and consequently the electromagnetic drive 13 is activated, which moves the diaphragm blades into the open position, i.e. maximum size or width diaphragm aperture position "C" (FIG. 5).

If the photographer wishes to cancel the above-described operating procedures, he merely needs to move the rotatable lever switch 18 in the opposition direction of rotation, i.e. from the ultimate or remote switching position "C" by way of the intermediate switching position "B" into the basic position "A" again, whereby the supply of current to the electromagnetic drive 13 is firstly interrupted and then the supply of current to the electromagnetic drive 12 is interrupted sequentially thereafter. This is equivalent to the diaphragm blades first returning to the pre-selected working aperture position and then the shutter segments returning again to the closed position.

If, beforehand, the exposure time is transmitted in conventional manner to the electronic control device 9 manually by a suitable setting means, e.g. shutter speed element, or automatically in dependence upon the lighting by means of a sensor, e.g. ambient light responsive photoelectric element, etc. then the electromagnetically operated shutter 7 may be desirably released, e.g. to take a photograph. For this purpose, a manual release button which is located on the control device may be actuated. As soon as this happens, by releasing an electrical switching pulse in the control circuit 11 of the control device 9, the electromagnetically operated shutter 7 is caused to fulfil its function, i.e. to open and close again after a longer or shorter interval of time, depending upon the selected shutter speed or exposure time exposure parameter as set by the manual setting means or shutter speed element, or automatically by the light sensor or photoelectric element, in conjunction with the pre-selected diaphragm working aperture size or width corresponding exposure parameter utilized therewith.

Instead of actuating the above-described conventional opening device of the control device 9 directly by means of the switch 18, which enables the ground-glass screen to be observed, i.e. at the intermediate position "B" or the ultimate position "C," a remote control cable may also be used, which is provided with a connecting plug connectable to a socket 22, which is usually located on the rear of the control device 9, and which is manually actuatable.

However, according to a preferred feature of the present invention, the remote control cable may be advantageously provided with an adapter which contains mechanically operated contact switches and which has a mechanical connection with the ground-glass screen frame 5 of the camera. In this way, a so-called automatic cassette mechanism is produced, such as is already known in principle with special cameras having a mechanical, i.e. spring-driven, shutter.

In this regard, it will be realized that where such automatic cassette mechanism is of the conventional type used for operating a mechanical or simple spring driven shutter, a simple flexible wire release or cable release is adequate to produce a direct mechanical connection between the ground-glass screen frame and the mechanical shutter. This simple connection, in conventional direct mechanical force transmission displacement manner, causes an automatic closure of the camera shutter if a film cassette is inserted into the ground-glass screen frame. On the other hand, in the case of a camera shutter having electromagnetically actuatable shutter segments and diaphragm blades, such a simple technique understandably cannot be used.

This is because an electromagnetic shutter basically has no independent directly controllable operating facilities whatsoever, i.e. one cannot readily exert a mechanical influence via such a direct mechanical force transmission displacement operating automatic cassette mechanism upon an electromagnetic drive. Furthermore, by circumventing the electromagnetic drive, one could only possibly achieve, if at all, an actuation of the shutter segments and diaphragm blades, by the extra expenditure attendant the providing of additional mechanical adjusting and/or compensating and/or interpositionable linkage mechanisms for thereby controlling the shutter segments and diaphragm blades selectively independently of the electromagnetic drive means, and which additional mechanical mechanisms would also understandably have to be accommodated in the limited space in the shutter housing.

A pre-requisite for obtaining an automatic cassette mechanism structure which may be operatively connected with a special remote-controlled camera of the type provided with an electromagnetic shutter is, therefore, that the automatic cassette mechanism structure permit a mechanical switching pulse, which is provided or imparted from the ground-glass screen frame upon the insertion in the usual way of a film cassette in the portion of the camera adjacent to such ground glass screen frame, to be converted into an electrical pulse and also that such structure permit this concordant electrical pulse to be transmitted to the electronic control device 9.

As can be seen from FIG. 1, the rear lens carrier 4 of the camera contemplated by the present invention is provided with a threaded bore 4a for this purpose, and the so-called adapter 26 is provided according to the present invention with a mechanical transmitting member 24, containing a connecting nipple 23 which is connectable to this bore 4a in a similar manner to a known cable release. At its other end, however, the transmitting member 24 is in turn connected, by means of a threaded nipple 25 to the housing of the so-called adapter 26.

Disposed in this adapter housing 26 according to the present invention are two mechanically actuatable or mechanical switching contacts 27 and 28, preferably conventional micro-switches, which are actuatable by displaceably arranged linkage means such as the two levers 30 and 31 which are rotatably mounted on a common pin 29. The disposition and design of these two levers 30 and 31 are selected in this case so that the lever 30, which can be influenced, in respect of its position, by the part 24a of the transmitter 24, carries along the other lever 31 in the event of a pressure load or mechanical force transmission displacement load exerted thereagainst by the part 24a, and for this purpose a laterally directed tab 30a which overlaps with the lever 31, is provided on the lever 30.

In turn, both mechanical contact switches 27 and 28 are concordantly connected to one end of an electrical conduit or cable 32, whose other end is provided with a plug 33. This plug 33 can be plugged conveniently into the socket 22 disposed on the rear of the control device 9 to complete the operative interconnection between the ground glass screen frame portion of the camera and the control device 9.

Since, as can be particularly seen from FIG. 3, the microswitches 27 and 28 are selectively designed as normally closed contacts, i.e. are closed in the rest position, a switching function is triggered by connecting the adapter 26 to the control device 9, e.g. via insertion of the adapter plug 33 into the socket 22 in the control circuit 11. This correspondingly causes current to be supplied to the electromagnetic drives 12 and 13 and thus automatically causes a full opening of the shutter segments and of the diaphragm blades in the objective shutter 7.

This corresponds to the ultimate position "C" (cf. FIG. 5). The camera is therefore in the maximum open operating state suitable for observing the ground-glass screen. Since normally no film cassette is inserted in the camera at this point, there is no fear of unintended exposure of the film through the fully open shutter and diaphragm systems.

If the photographer now decides to take a photograph and, as indicated in FIG. 1, inserts a separate and independent film cassette 35 of the usual type into the rear lens carrier or ground-glass screen frame 4, 5, along a corresponding cassette path through a cassette receiving slot thereat in the usual manner, then the cassette 35, e.g. at the end of its insertion movement, acts upon the displaceable part 24a of the transmitter 24 which is suitably disposed in such slot path for contact with such cassette. The transmitter 24 thereupon automatically actuates the rest contacts of the switches 27 and 28 by way of the two levers 30 and 31. The switch actuation is concordantly electrically communicated, via the cable connection 32, to the control device 9 which in conventional manner reverses the current flow in the coil system of the electromagnetic drive 12 that normally keeps the shutter segments in the open position, and interrupts the supply of current to the electromagnetic drive 13, that normally keeps the diaphragm blades also in the open position.

This electrical switching pulse results, in turn, in the shutter segments closing fully under the reversed current flow in the electromagnetic drive 12 and the diaphragm blades building up to the pre-set aperture width under the current supply interruption to the electromagnetic drive 13.

This corresponds to the basic position "A" (cf. FIG. 5). The camera shutter can now be triggered to take the photograph, and for this purpose a release button must be actuated, e.g., which is provided on the control device 9.

If the photographer prior to insertion of the film cassette wishes to include in the consideration of the ground-glass screen a judgment of the depth of field, i.e. which involves the diaphragm aperture size or width exposure parameter independently of the shutter speed exposure parameter, then, with a connected adapter 26, the photographer need merely press the finger button 38, which is displaceably guided in the housing of the adapter 26, to change the shutter and diaphragm system from the ultimate position "C" to the intermediate position "B." This button 38 in turn acts independently only upon the second or separate arm 31a of the two armed lever 31, which is designed preferably as an angular lever, and thus breaks only the contact in the switch 28.

While, in this case, the supply of current to the electromagnetic drive 13 is thereby interrupted and, as a result, the diaphragm blades are caused in conventional manner to build up to the desired pre-selected aperture width, i.e. from the ultimate fully open position "C," the lever 30, which is associated with the switching contact 27, remains in its hitherto-existing position, which means that the shutter segments of the electromagnetic shutter are also maintained, i.e., remain, in the open position.

This corresponds to the intermediate position "B" (cf. FIG. 5). The depth of field may now be viewed by the photographer through the rear window and screen of the rear carrier 4, the tubular bellows 3 and the front lens opening or objective aperture in the desired manner.

Figure 8:
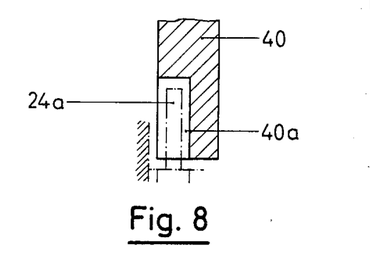
FIG. 8 is a schematic view which shows one end of a measuring cassette provided with a recess, in relation to the arrangement shown in FIG. 1.

In preparing to take photographs of particular objects having a marked contrast, it may be useful for the photographer to employ a measuring cassette 40 (cf. FIG. 8), which is known per se and which is provided with an appropriate light sensor. Such measuring cassette 40 can be inserted in the same way as the film cassette 35 into the lens carrier 4 at the insertion slot adjacent the ground-glass screen frame 5 such as when setting the exposure parameter. Since an actuation of the part 24a of the adapter 26, which lies in the cassette insertion path, must be prevented when inserting the measuring cassette 40 into the lens carrier 4 at the ground-glass screen frame because, otherwise, the shutter segments would change over into the closed position and the diaphragm blades would change over into the working position, i.e. from the ultimate position "C" to the basic position "A," the measuring cassette, as shown in FIG. 8, has been provided with a recess 40a. This recess 40a conveniently avoids a pressure load or displacement load being exerted upon the movable part 24a of the transmitter 24 by the so inserted measuring cassette 40, and allows use of the measuring cassette at the ultimate position "C."

Figure 4:
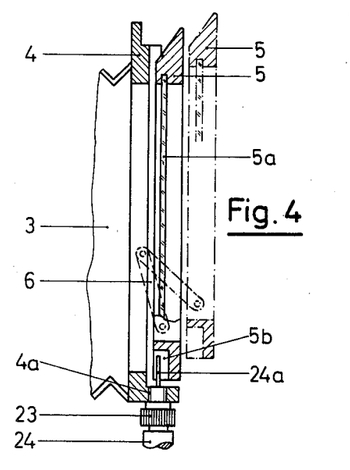
FIG. 4 is a schematic larger scale view corresponding to FIG. 1 which shows the connection between a flexible transmitter member and the rear lens carrier or ground-glass screen frame of the camera, shown in sectional form.

The ground-glass screen frame 5 also conveniently has, of couse, a corresponding such recess 5b in the lower edge region, as FIG. 4 clearly shows. Thus, when any such cassette is removed, the ground glass screen frame 5 may be forwardly displaced in conventional manner to close the slot between frame 5 and carrier 4 under the return spring action of the spring-loaded linkage lugs 6, without contacting the part 4a of the actuator 26, and thus without disturbing the ultimate position "C" condition of the shutter and diaphragm systems.

In FIG. 5, on a larger scale, that region of the housing of the control device 9 is shown in which the rotatable lever switch 18, which is used for the manual opening of the shutter and diaphragm for observing the ground-glass screen, is disposed. If the photographer has decided to use the automatic cassette mechanism, i.e. to use the adapter 26, when taking a photograph, instead of the control device 9 alone, and the film cassette 35 has already been inserted in the camera, then this presumes that the switch 18 must first adopt the switching position "A" and not be in one of the other possible switching positions "B" or "C." This is because only in the basic switching position "A" is the shutter in the closed position and the diaphragm blades in the pre-set working position, i.e. prior to the shutter release of the camera.

Operating errors, which would result from an incorrect pre-setting of the toggle switch 18, in this regard, can be avoided with absolute certainty in a simple manner according to the present invention by selectively disposing the socket 22', which serves to accommodate the plug 33 of the adapter 26, so that it is only possible to attach the plug 33 when the switch 18 is in the switching position "A." In the other two switching positions "B" and "C," the switch toggle 18 lies at least partially over the socket 22' and thus prevents any such plug connection thereat, and which could prematurely expose the film in the film cassette if already inserted in the camera prior to plugging the plug 33 in the socket 22'.

Figure 7:
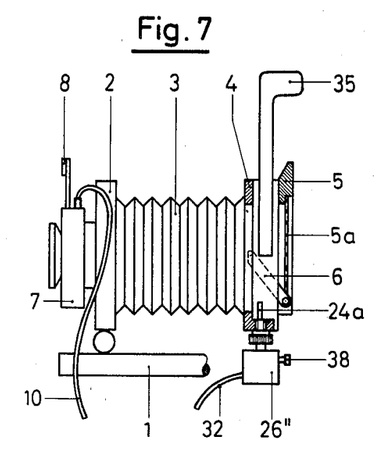
FIG. 7 is a schematic view which shows a further modified arrangement provided with a direct connection between the adapter and the lens carrier or ground-glass screen frame of the camera.

According to the further embodiments, shown in FIGS. 6 and 7, of the above-described automatic cassette mechanism for special cameras having an electromagnetic shutter, the corresponding modified adapter 26' or 26" may be provided, such that adapter 26' may be attached directly to the control housing 9 (FIG. 6) or such that the adapter 26" may be attached directly to the rear lens carrier 4 or ground-glass screen frame 5 of the camera (FIG. 7), as the case may be. In the case of an analogous design for these two variants of the adapter arrangements, which is consistent with the above-described concept of an adapter from the point of view of switch components and actuating elements, the use of the mechanical transmitter 24 can be eliminated in one case, i.e. that of adapter 26", and the use of the electrical cable 32 can be eliminated in the other case, i.e. that of adapter 26'.

Consequently, according to the overall aspects of the present invention, an advantageous photographic camera apparatus or arrangement is provided, comprising a camera having a rear window housing section, e.g. rear carrier 4, containing a rear viewing window and a rear receiving portion, e.g. rear frame 5, operatively arranged adjacent the window for removably receiving a separate cassette, e.g. film cassette 35, insertable thereat for cooperating disposition at the window, and a front lens and shutter system housing, e.g. front carrier 2, containing a controllable exposure shutter and a controllable aperture size diaphragm (c f. FIG. 5 at A and B, respectively) and electromagnetic means, e.g. electromagnetic drives 12 and 13, for correspondingly operating the shutter and diaphragm, a separate electronic control device for selectively operatively controlling the corresponding exposure parameters of the camera, e.g. via circuit 11, and operatively electrically connectable, e.g. via cable 10, to the electromagnetic means for controlling the operation of the shutter and diaphragm, and a mechanical conversion adapter.

In this regard, the mechanical conversion adapter has a mechanical transmitter portion, e.g. member 24, operatively connectable to the rear housing section, an electrical conductor portion, e.g. cable 32, operatively connectable to the control device, an intermediate converter portion containing mechanically operated electrical switch means, e.g. switches 27 and 28, electrically connectable by the conductor portion to the control device for controlling the operation of the control device and electromagnetic means for correspondingly controlling the operation of the shutter and diaphragm, and a mechanical transmitter means, e.g. part 24a, operatively arranged in the transmitter portion for displacement between a rest position and an actuating position and including a cassette contact surface (cf. FIGS. 1 and 7), operatively arranged in the rest position adjacent the rear receiving portion for mechanical engagement displacement of the transmitter means by the cassette to the actuating position upon such insertion of the cassette, and a switch contact surface (cf. FIG. 2), arranged for actuating the switch means in the intermediate converter portion upon such transmitter means displacement to the actuating position, for converting corresponding mechanical displacement pulses of the transmitter means in response to such cassette insertion into electrical pulses of the switching means for controlling the control device for operating the electromagnetic means.

More specifically, the electromagnetic means and control device are operatively arranged for independently operating the shutter, e.g. via electromagnetic drive 12, and for independently operating the diaphragm, e.g. via electromagnetic drive 13, the mechanically operated switch means include a shutter switch, e.g. switch 27, operatively connected with the control device and electromagnetic means for independently controlling the operation of the shutter and a diaphragm switch, e.g. switch 28, operatively connected with the control device and electromagnetic means for independently controlling the operation of the diaphragm, a diaphragm lever, e.g. lever 31, is pivotally arranged, e.g. via pin 29, for actuating the diaphragm switch and is provided with a mechanical force receiving portion, e.g. the body of diaphragm lever 31, a shutter lever, e.g. lever 30, is pivotally arranged, e.g. via pin 29, for actuating the shutter switch and is provided with a mechanical force imparting portion, e.g. tab 30a, for imparting a mechanical force to the force receiving portion of the diaphragm lever, and the switch contact surface of the transmitter means is arranged for pivoting the shutter lever both for actuating the shutter switch and for pivoting in turn the diaphragm lever by imparting a corresponding mechanical force thereto for correspondingly actuating the diaphragm switch by the diaphragm lever.

Preferably, a push button, e.g. button 38, is operatively arranged for independently pivoting the diaphragm lever for actuating the diaphragm switch independently of the actuation of the shutter switch by the shutter lever.

More particularly, the shutter lever may be advantageously provided as a one armed lever, the diaphragm lever may be advantageously provided as a two armed lever having a first arm arranged for directly actuating the diaphragm switch and a second arm, e.g. arm 31a, arranged for receiving an urging force from the push button for independently pivoting the diaphragm lever for actuating the diaphragm switch, and the one armed shutter lever may be advantageously arranged for contacting the first arm of the diaphragm switch and for contacting the shutter switch for simultaneously actuating the diaphragm switch and the shutter switch independently of the push button upon the pivoting of the one armed shutter lever by the switch contact surface of the transmitter means.

In regard to the interconnections among the camera, control device and mechanical conversion adapter, in accordance with one embodiment of the present invention, e.g. FIG. 1, preferably the transmitter portion constitutes a cable release mechanism, containing the transmitter means as a release cable element therein, e.g. part 24a, for connecting the adapter to rear housing section, and the conductor portion constitutes an electrical cable, e.g. cable 32, for connecting the adapter to the control device.

In accordance with another embodiment of the present invention, e.g. FIG. 7, preferably the transmitter portion constitutes a mechanical mounting nipple, e.g. at adapter 26", for directly removably mounting the adapter on the rear housing section with the cassette contact surface of the transmitter means arranged in the rest position adjacent the rear receiving portion, and the conductor portion is provided as a linear electrical cable, e.g. cable 32, having a plug, e.g. plug 33 (cf. FIG. 5), for removably connecting the adapter to the control device.

In accordance with a further embodiment of the present invention, e.g. FIG. 6, preferably the conductor portion constitutes a mechanical mounting connector, e.g. at adapter 26', for directly removably mounting the adapter on the control device in connective electrical connection therewith, and the transmitter portion constitutes a linear mechanical transmitter cable, e.g. a cable release mechanism (cf. FIG. 2).

With respect to a preferred feature of the present invention, e.g. FIG. 8, the control device is provided with a socket, e.g. socket 22', and the conductor portion is provided with a plug, e.g. plug 33 (cf. FIG. 3), for connecting the adapter to the control device in the socket, the control device includes a rotatably mounted selector switch, e.g. switch 18, having a handle member arranged for movement along a rotatable path between a first control position, e.g. position "A," for maintaining the shutter closed and the diaphragm at a selectively sized working aperture and at least a further control position, e.g. position "B" and position "C," for maintaining the shutter open and the diaphragm at an aperture size permitting viewing through the rear viewing window, and the socket is interferingly arranged in the rotatable path of the handle member in interfering relation to the disposition of the handle member for permitting the plug to be connected in the socket only when the handle member is at the first position.

Stated another way, the present invention contemplates a photographic camera apparatus or arrangement comprising a camera, a control device connectable to the camera, and an adapter connectable to the camera and to the control device.

As to the camera, this has a rear window housing section containing a rear viewing window and a rear receiving portion operatively arranged adjacent the window and defining a slot therewith (cf. FIG. 4) for removably receiving a separate cassette insertable along a cassette path thereat (cf. FIG. 1) for cooperating disposition at the window, and also has a front lens and shutter housing containing a shutter having shutter segments, a diaphragm having diaphragm blades and electromagnetic means for correspondingly operating the shutter and diaphragm and operatively arranged for independently moving the shutter segments between a closed shutter position, e.g. position "A" in FIG. 5, and an open shutter position, e.g. positions "B" and "C" in FIG. 5, and for independently moving the diaphragm blades between a closed aperture position and an open shutter position, e.g. positions "B" and "C" in FIG. 5.

As to the control device, this comprises a separate electronic control circuit control device energizable for selectively operatively setting, measuring and controlling the corresponding shutter exposure parameters of the camera (cf. FIG. 3), and operatively electrically connectable to the electromagnetic means for independently controlling the moving of the shutter segments and for independently controlling the moving of the diaphragm blades (cf. FIGS. 3 and 5).

As to the adapter, this comprises a mechanical force transmission conversion adapter having a mechanical force transmitter portion operatively connectable to the rear housing section adjacent the cassette path, an electrical conduit conductor portion operatively connectable to the control device, an intermediate switching pulse converter housing portion containing a mechanically operated electrical shutter switch and a mechanically operated electrical diaphragm switch correspondingly electrically connectable by the conductor portion to the control device for controlling the operation of the control device and electromagnetic means for correspondingly independently controlling the moving of the shutter segments and for correspondingly independently controlling the moving of the diaphragm blades, and also containing displaceably arranged linkage means, e.g. levers 30 and 31, for actuating the shutter switch and diaphragm blades, and a mechanical force transmitter linear means, e.g. part 24a, having a cassette end (cf. FIGS. 1 and 7) and a switch end (cf. FIG. 2).

The transmitter means is operatively arranged in the transmitter portion for displacement between a rest position and an actuating position and includes a cassette contact surface at the cassette end arranged in the rest position in the cassette path for mechanical engagement displacement of the transmitter means by the cassette to the actuating position upon insertion of the cassette along the path and a switch contact surface at the switch end arranged for displacing the linkage means for correspondingly actuating the shutter switch and diaphragm switch in the intermediate converter housing portion upon such displacement of the transmitter means to the actuating position, for converting corresponding mechanical displacement pulses of the transmitter means in response to such cassette insertion into electrical pulses of the shutter switch and diaphragm switch for controlling the control device for operating the electromagnetic means.

More specifically, preferably the linkage means includes a shutter lever and a diaphragm lever, the shutter lever is pivotally arranged for actuating the shutter switch and the switch end of the transmitter means is arranged for correspondingly pivoting the shutter lever for actuating the shutter switch upon displacement of the transmitter means to actuating position, the diaphragm lever is pivotally arranged for actuating the diaphragm switch and the shutter lever is arranged with respect to the diaphragm lever for simultaneously pivoting the diaphgram lever for actuating the diaphragm switch by the diaphragm lever upon displacement of the transmitter means to activating position, and a push button is operatively arranged for independently pivoting the diaphgram lever for actuating the diaphragm switch independently of the actuation of the shutter switch by the shutter lever.

It will be appreciated, of course, that the transmitter means is automatically normally maintained in the rest position by the return spring arrangement of the mechanical switches 27 and 28 which normally maintains these switches in closed position (cf. FIGS. 2 and 3), and that upon cassette insertion in the camera, the transmitter means moves to actuating position to open the mechanical switches 27 and 28 against the force of such return spring arrangement. Hence, upon removal of the cassette, the transmitter means is relieved of the pressure load or mechanical load of the cassette, and the force of the return spring arrangement of the mechanical switches automatically moves the transmitter means back to its original rest position. Other spring arrangements may also be used.

Naturally, the length of the transmitter means, e.g. part 24a, must be such that when connected at the rear frame of the camera, the switch end thereof will be in operative, e.g. abutting, contact relation with the switches, e.g. via the linkage means, e.g. at lever 30, and the cassette end thereof will be in operative, e.g. directly abuttable, contact relation with a portion of the cassette insertable in the camera, so that when the cassette is inserted, the transmitter means will move a sufficient minimum distance to break the closed contact position of the switches in the desired manner for closing the shutter and placing the diaphragm in the working size aperture condition concordantly selected by the diaphragm adjuster 8 on the front shutter 7 of the front carrier 8.

It will be appreciated that the foregoing specification and accompanying drawings are set forth by way of illustration and not limitation, and that various modifications and changes may be made therein without departing from the spirit and scope of the present invention which is to be limited solely by the scope of the appended claims.

What is claimed is:
1. Photographic camera apparatus comprising
a camera having a rear window housing section containing a rear viewing window and a rear receiving portion operatively arranged adjacent the window for removably receiving a separate cassette insertable thereat for cooperating disposition at the window, and a front lens and shutter system housing containing a controllable exposure shutter and a controllable aperture size diaphragm and electromagnetic means for correspondingly operating the shutter and diaphragm,
a separate electronic control device for selectively operatively controlling the corresponding exposure parameters of the camera, and operatively electrically connectable to the electromagnetic means for controlling the operation of the shutter and diaphragm, and a mechanical conversion adapter having a mechanical transmitter portion operatively connectable to the rear housing section, an electrical conductor portion operatively connectable to the control device, an intermediate converter portion containing mechanically operated electrical switch means electrically connectable by the conductor portion to the control device for controlling the operation of the control device and electromagnetic means for correspondingly controlling the operation of the shutter and diaphragm, and a mechanical transmitter means operatively arranged in the transmitter portion for displacement between a rest position and an actuating position and including a cassette contact surface operatively arranged in the rest position adjacent the rear receiving portion for mechanical engagement displacement of the transmitter means by the cassette to the actuating position upon such insertion of the cassette and a switch contact surface arranged for actuating the switch means in the intermediate converter portion upon such transmitter means displacement to the actuating position, for converting corresponding mechanical displacement pulses of the transmitter means in response to such cassette insertion into electrical pulses of the switching means for controlling the control device for operating the electromagnetic means.

2. Apparatus according to claim 1 wherein the electromagnetic means and control device are operatively arranged for independently operating the shutter and for independently operating the diaphragm, the mechanically operated switch means include a shutter switch operatively connected with the control device and electromagnetic means for independently controlling the operation of the shutter and a diaphgragm switch operatively connected with the control device and electromagnetic means for independently controlling the operation of the diaphragm, a diaphragm lever is pivotally arranged for actuating the diaphragm switch and is provided with a mechanical force receiving portion, a shutter lever is pivotally arranged for actuating the shutter switch and is provided with a mechanical force imparting portion for imparting a mechanical force to the force receiving portion of the diaphragm lever, and the switch contact surface of the transmitter means is arranged for pivoting the shutter lever both for actuating the shutter switch and for pivoting in turn the diaphragm lever by imparting a corresponding mechanical force thereto for correspondingly actuating the diaphragm switch by the diaphragm lever.

3. Apparatus according to claim 2 wherein a push button is operatively arranged for independently pivoting the diaphragm lever for actuating the diaphragm switch independently of the actuation of the shutter switch by the shutter lever.

4. Apparatus according to claim 3 wherein the shutter lever is a one armed lever, the diaphragm lever is a two armed lever having a first arm arranged for directly actuating the diaphragm switch and a second arm arranged for receiving an urging force from the push button for independently pivoting the diaphragm lever for actuating the diaphragm switch, and the one armed shutter lever is arranged for contacting the first arm of the diaphragm switch and for contacting the shutter switch for simultaneously actuating the diaphragm switch and the shutter switch independently of the push button upon the pivoting of the one armed shutter lever by the switch contact surface of the transmitter means.

5. Apparatus according to claim 1 wherein the transmitter portion constitutes a cable release mechanism, containing the transmitter means as a release cable element therein, for connecting the adapter to the rear housing section, and the conductor portion constitutes an electrical cable for connecting the adapter to the control device.

6. Apparatus according to claim 1 wherein the transmitter portion constitutes a mechanical mounting nipple for directly removably mounting the adapter on the rear housing section with the cassette contact surface of the transmitter means arranged in the rest position adjacent the rear receiving portion, and the conductor portion is provided as a linear electrical cable having a plug for removably connecting the adapter to the control device.

7. Apparatus according to claim 1 wherein the conductor portion constitutes a mechanical mounting connector directly removably mounting the adapter on the control device in conductive electrical connection therewith, and the transmitter portion constitutes a linear mechanical transmitter cable.

8. Apparatus according to claim 1 wherein the control device is provided with a socket and the conductor portion is provided with a plug for connecting the adapter to the control device in the socket, the control device includes a rotatably mounted selector switch having a handle member arranged for movement along a rotatable path between a first control position for maintaining the shutter closed and the diaphragm at a selectively sized working aperture and at least a further control position for maintaining the shutter open and the diaphragm at an aperture size permitting viewing through the rear viewing window, and the socket is interferingly arranged in the rotatable path of the handle member in interfering relation to the disposition of the handle member for permitting the plug to be connected in the socket only when the handle member is at the first position.

9. Photographic camera apparatus comprising
a camera having a rear window housing section containing a rear viewing window and a rear receiving portion operatively arranged adjacent the window and defining a slot therewith for removably receiving a separate cassette insertable along a cassette path thereat for cooperating disposition at the window, and a front lens and shutter system housing containing a shutter having shutter segments, a diaphragm having diaphragm blades and electromagnetic means for correspondingly operating the shutter and diaphragm and operatively arranged for independently moving the shutter segments between a closed shutter position and an open shutter position and for independently moving the diaphragm blades between a closed aperture position and an open aperture position,
a separate electronic circuit control device energizable for selectively operatively setting, measuring and controlling the corresponding shutter exposure parameters of the camera, and operatively electrically connectable to the electromagnetic means for independently controlling the moving of the shutter segments and for independently controlling the moving of the diaphragm blades, and
a mechanical force transmission conversion adapter having a mechanical force transmitter portion operatively connectable to the rear housing section adjacent the cassette path, an electrical conduit conductor portion operatively connectable to the control device, an intermediate switching pulse converter housing portion containing a mechanically operated electrical shutter switch and a mechanically operated electrical diaphragm switch correspondingly electrically connectable by the conductor portion to the control device for controlling the operation of the control device and electromagnetic means for correspondingly independently controlling the moving of the shutter segments and for correspondingly independently controlling the moving of the diaphragm blades, and also containing displaceably arranged linkage means for actuating the shutter switch and diaphragm blades, and a mechanical force transmitter linear means having a cassette end and a switch end and operatively arranged in the transmitter portion for displacement between a rest position and an actuating position and including a cassette contact surface at the cassette end arranged in the rest position in the cassette path for mechanical engagement displacement of the transmitter means by the cassette to the actuating position upon insertion of the cassette along the path and a switch contact surface at the switch end arranged for displacing the linkage means for correspondingly actuating the shutter switch and diaphragm switch in the intermediate converter housing portion upon such displacement of the transmitter means to the actuating position, for converting corresponding mechanical displacement pulses of the transmitter means in response to such cassette insertion into electrical pulses of the shutter switch and diaphragm switch for controlling the control device for operating the electromagnetic means.

10. Apparatus according to claim 9 wherein the linkage means includes a shutter lever and a diaphragm lever, the shutter lever is pivotally arranged for actuating the shutter switch and the switch end of the transmitter means is arranged for correspondingly pivoting the shutter lever for actuating the shutter switch upon displacement of the transmitter means to actuating position, the diaphragm lever is pivotally arranged for actuating the diaphragm switch and the shutter lever is arranged with respect to the diaphragm lever for simultaneously pivoting the diaphragm lever for actuating the diaphragm switch by the diaphragm lever upon displacement of the transmitter means to actuating position, and a push button is operatively arranged for independently pivoting the diaphragm lever for actuating the diaphragm switch independently of the actuation of the shutter switch by the shutter lever.

* * * * *